US009413966B2

(12) United States Patent
Chiu

(10) Patent No.: US 9,413,966 B2
(45) Date of Patent: Aug. 9, 2016

(54) METHOD OF PREVIEWING PROCESSED IMAGE, DEVICE USING THE SAME, AND STORAGE MEDIUM HAVING COMPUTER PROGRAM STORED THEREON

(71) Applicant: HTC Corporation, Taoyuan County (TW)

(72) Inventor: Chia-Wei Chiu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 239 days.

(21) Appl. No.: 13/959,754

(22) Filed: Aug. 6, 2013

(65) Prior Publication Data

US 2015/0042835 A1    Feb. 12, 2015

(51) Int. Cl.
*H04N 5/232* (2006.01)
*H04N 5/262* (2006.01)

(52) U.S. Cl.
CPC ......... *H04N 5/23293* (2013.01); *H04N 5/2621* (2013.01); *H04N 5/23216* (2013.01)

(58) Field of Classification Search
None
See application file for complete search history.

(56) References Cited

U.S. PATENT DOCUMENTS

2009/0295944 A1* 12/2009 Tashiro et al. ............ 348/231.99
2013/0083211 A1*  4/2013 Kunishige et al. ......... 348/220.1
2015/0172534 A1*  6/2015 Miyakawa et al. ........ 348/222.1

* cited by examiner

*Primary Examiner* — Xiao Wu
*Assistant Examiner* — Steven Elbingher
(74) *Attorney, Agent, or Firm* — Jianq Chyun IP Office

(57) ABSTRACT

The present disclosure proposes a method of previewing a processed image, a portable handheld electronic device using the same method, and a non-transitory storage medium which stores computer programs to execute the same method in a portable handheld electronic device. The method includes displaying on the touch screen an image, displaying on the touch screen a movable effect grid which is divided into a plurality of areas according to a predetermined pattern with each area producing a different effect, performing image processing between the image and the movable effect grid to generate a first preview image which has different effects in different areas defined by the predetermined pattern, and displaying the first preview image on the touch screen.

18 Claims, 7 Drawing Sheets

METHOD OF PREVIEWING PROCESSED IMAGE, DEVICE USING THE SAME, AND STORAGE MEDIUM HAVING COMPUTER PROGRAM STORED THEREON

TECHNICAL FIELD

The present disclosure generally relates to a method of previewing a processed image, a portable handheld electronic device using the same method, and a non-transitory storage medium which stores computer programs to execute the same method in a portable handheld electronic device.

RELATED ART

A portable multi-purpose handheld communication device such as a smart phone has been a preeminent derivative of the most recent technological development as data processing, personal organizing, multimedia applications with touch screens, and telephone functions are integrated into a portable and pocket sized computer. As a portable communication device such as a smart phone has become increasingly versatile, recent smart phones have included a digital camera and a camcorder which have enabled users to capture still images and videos and to play images or videos through multimedia players. Users of smart phones may further activate multimedia applications which would allow users to not only edit captured stills or videos to generate customized multimedia files but also to generate various "effects" for these multimedia files. These effects, for example, could be Distortion, Vignette, Depth of Field, Dots, Mono, Country, Vintage, Vintage Warm, Vintage Cold, Grayscale, Sepia, Negative, Solarize, Posterize, and Aqua.

Presently these effects can be generated digitally through digital image processing filters. By applying various filters to videos and photos which has been captured using a related application on a smart phone, a user may generate a multitude of filtered multimedia files having different effects. Otherwise, a user may also apply these effects to a still image or a video before they are captured and observe the application of these effects from preview images. For instance, a user may first activate a digital camera application from a smart phone and observe raw preview images in a video like form, and then the user may activate an effect function to observe the effect of filtered images assuming that one such feature is provided. However, currently if a user needs to switch among different preview images in a camera mode in order to experiment with different effects, the user needs to switch among different filters one by one, which could be somewhat time consuming and tedious. Therefore, there needs to be a solution which could compare different preview images by putting them side by side.

One such method could be to generate preview images for side by side comparison is to create an application to apply different filters to numerous instances of an image after the image is captured and stored as an image file. For example, a user may first select a photograph and a plurality of different filters. Next, the application may create instances of the same captured image with a different filter applied for each instance. The aim of this method is to preview a list of filtered images in order to compare among different effects. These images could be listed in a 3 by 3 matrix so that a user may compare among various effects and select a preferred image among 9 different images.

Such implementation would not be without difficulties as a portable device usually has certain physical constraints—a portable device is typically required to take on attributes of lightness, slimness, shortness and smallness. These physical constraints would mean that the size of a touch screen disposed on a portable device is constricted, especially if the portable device has to be a pocket size. When a touch screen of a portable handheld electronic device has to display nine different images or more, the user may not be able to accurate observe the differences among these effects since the size of the image could be assumed to be roughly 9 times smaller than the size of the touch screen. Furthermore, when a photograph is displayed 9 times smaller on a touch screen, resolution of the photograph is inevitably reduced. Since the resolution of a photograph is defined in terms of pixels by pixels. When a photograph is displayed in a reduced size, some resolution is lost due to the fact that the number of pixels is also diminished. Also, if the effect of a filter is subtle, reduced resolution in combination with reduced touch screen size would mean that a user could be unable to discern among various effects easily.

Furthermore, the number of keys and buttons disposed on a portable handheld electronic device as well as their sizes are also limited. Reduction of the screen size may limit batches of information capable of being displayed on the screen, and reduction of the number of the keys and the size thereof increases difficulty of user input as a user may struggle to spend considerable time and effort to navigate a user interface in order to switch and compare between different effects. Therefore, a method could be proposed to further improve the functions related to previewing filtered images or videos such that users could easily make comparisons and navigate among different images or videos.

SUMMARY OF THE DISCLOSURE

The somewhat diminutive nature of a portable handheld electronic device relative to a normal sized monitor has influenced the design of various applications in such a way that applications originally intended for desktop computer may not be appropriate in an electronic device such as a smart phone because of the smallness of a touch screen. Therefore, a method and a device to preview and compare a processed age through an interface with convenient control and navigational functions is proposed.

The present disclosure generally relates to a method of previewing filtered images, a portable handheld electronic device using the same method, and a non-transitory storage medium which stores computer programs to execute the same method in a portable handheld electronic device.

Accordingly, in one of the exemplary embodiments, the present disclosure displays on the touch screen an image which could be a still image or a motion picture. The touch screen also displays a movable effect grid which is divided into a plurality of areas according to a predetermined pattern with each area producing a different effect. The movable grid interacts with the image such that image processing is performed between the image and the movable effect grid to generate a preview image. The preview image is displayed in the same predetermined pattern with each area of the preview image influenced by different effects of the effect grid.

In one of the exemplary embodiments, the present disclosure further includes moving the effect grid displayed on the touch screen according to a first touch action on the touch screen to generate a different preview image. By moving the effect grid to a different location, the second preview image may exhibit different effects in different areas since the location of the effect grid is different as each area of the effect grid interacts with a different area of the image from before, and thus a different preview image is generated.

In one of the exemplary embodiments, the present disclosure further includes selecting from the plurality of areas of the effect grid a first area which may have a first effect according to a second touch action on the first area. A (final) processed image would then be generated from the entirety of the image based on the first effect. The processed image would then be displayed on the touch screen.

In one of the exemplary embodiments, the present disclosure which generates a processed image could be applied in a camera or camcorder application of the portable handheld electronic device. In these applications, a processed image as well as a preview image could be generated from the raw footage and displayed on the touch screen using the effect grid before the image is captured.

In one of the exemplary embodiments, the present disclosure further includes applying a two finger touch action on the effect grid to adjust the size of the effect grid such that the effect grid is enlarged when the distance between the two fingers lengthens and the effect grid is shortened when the distance between the two fingers shortens.

In one of the exemplary embodiments, the present disclosure further includes a feature of the size of the effect grid is larger than the touch screen. This implies that a portion of the effect grid would be displayed on the touch screen, and the rest of the portion would be invisible.

In one of the exemplary embodiments, the present disclosure further includes each area of the effect grid has the same default size. This implies that when the overall size of the effect grid is enlarged or reduced, all the areas of the effect grid would be enlarged or reduced in the same proportion such that the size of the effect grid would remain the same.

In one of the exemplary embodiments, the present disclosure further includes the first touch action is a touch and slide action such that the movement of the effect grid corresponds to the movement of the slide action in terms of direction and displacement.

In one of the exemplary embodiments, the present disclosure further includes the second touch action is a touch and release action such that the processed image is generated in response to the release action of the touch and release action.

In one of the exemplary embodiments, the present disclosure further includes a feature that the number of the areas of the effect grid is user configurable via a settings menu. If a user prefers to see more effects being compared, the user may configure the effect grid to have more areas. Less number of areas of the effect grid would mean larger area per effect being compared with.

The present disclosure directs to a portable handheld electronic device which includes at least but not limited to a touch screen, a storage medium, and a processing circuit which is coupled to the touch screen and the storage medium. Accordingly to one of the exemplary embodiments, the touch screen displays an image which could be a still image or a motion picture. The touch screen also displays a movable effect grid which is divided into a plurality of areas according to a predetermined pattern with each area producing a different effect. The processing circuit configures the movable grid to interact with the image such that image processing is performed by the processing circuit between the image and the movable effect grid to generate a preview image. The touch screen then displays the preview image in the same predetermined pattern with each area of the preview image influenced by different effects of the effect grid.

In one of the exemplary embodiments, the device further includes an input unit for detecting a first touch action which moves the effect grid displayed on the touch screen to generate a different preview image. By moving the effect grid to a different location, the second preview image may exhibit different effects in different areas since the location of the effect grid is different as each area of the effect grid interacts with a different area of the image from before, and thus a different preview image is generated.

In one of the exemplary embodiments, the processing circuit is further configured to select from the plurality of areas of the effect grid a first area which may have a first effect according to a second touch action on the first area. A (final) processed image would then be generated by the processing circuit from the entirety of the image based on the first effect. The processed image would then be displayed on the touch screen.

In one of the exemplary embodiments, the processing circuit which generates a processed image through the touch screen could be applied in a camera or camcorder application of the portable handheld electronic device. In these applications, a processed image as well as a preview image could be generated by the processing circuit from the raw footage and displayed on the touch screen using the effect grid before the image is captured.

In one of the exemplary embodiments, the input unit of the device may detect a two finger touch action on the effect grid. In response to the touch action detected by the input unit, the processing circuit may then adjust the size of the effect grid such that the effect grid is enlarged when the distance between the two fingers lengthens and the effect grid is shortened when the distance between the two fingers shortens.

In one of the exemplary embodiments, the processing circuit configures the size of the effect grid is larger than the touch screen. This implies that a portion of the effect grid would be displayed on the touch screen, and the rest of the portion would be invisible.

In one of the exemplary embodiments, the present disclosure further includes each area of the effect grid is configured by the processing circuit to have the same default size. This implies that when the overall size of the effect grid is enlarged or reduced, all the areas of the effect grid would be enlarged or reduced by the processing circuit in the same proportion such that the size of the effect grid would remain the same.

In one of the exemplary embodiments, the first touch action detected by the input unit is a touch and slide action such that the movement of the effect grid corresponds to the movement of the slide action in terms of direction and displacement.

In one of the exemplary embodiments, the second touch action detected by the input unit is a touch and release action such that the processed image is generated in response to the release action of the touch and release action.

In one of the exemplary embodiments, the number of the areas of the effect grid is user configurable by the processing circuit via a settings menu. If a user prefers to see more effects being compared, the user may configure the effect grid to have more areas in the settings menu. Less number of areas of the effect grid would mean larger area per effect being compared with.

The present disclosure directs to a non-transitory storage medium which stores computer programs configured to execute the functions in a portable handheld electronic device, and the program execute steps which include to display on the touch screen an image which could be a still image or a motion picture. The touch screen also displays a movable effect grid which is divided into a plurality of areas according to a predetermined pattern with each area producing a different effect. The movable grid interacts with the image such that image processing is performed between the image and the movable effect grid to generate a preview image. The preview image is displayed in the same predetermined pattern with each area of the preview image influenced by different effects of the effect grid In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

No element, act, or instruction used in all the embodiments of the present application should be construed as critical or essential to the present disclosure unless explicitly described as such. Also, as used herein, each of the indefinite articles "a" and "an" is intended to exclude more than one item. If only one item is intended, the terms "a single" or similar languages could be used. Furthermore, the terms "any of" followed by a listing of a plurality of items and/or a plurality of categories of items, as used herein, are intended to include "any of", "any combination of", "any multiple of", and/or "any combination of" multiples of the items and/or the categories of items, individually or in conjunction with other items and/or other categories of items. Further, as used herein, the term "set" is intended to include any number of items, including zero. Further, as used herein, the term "number" is intended to include any number, including zero.

Figure 1:
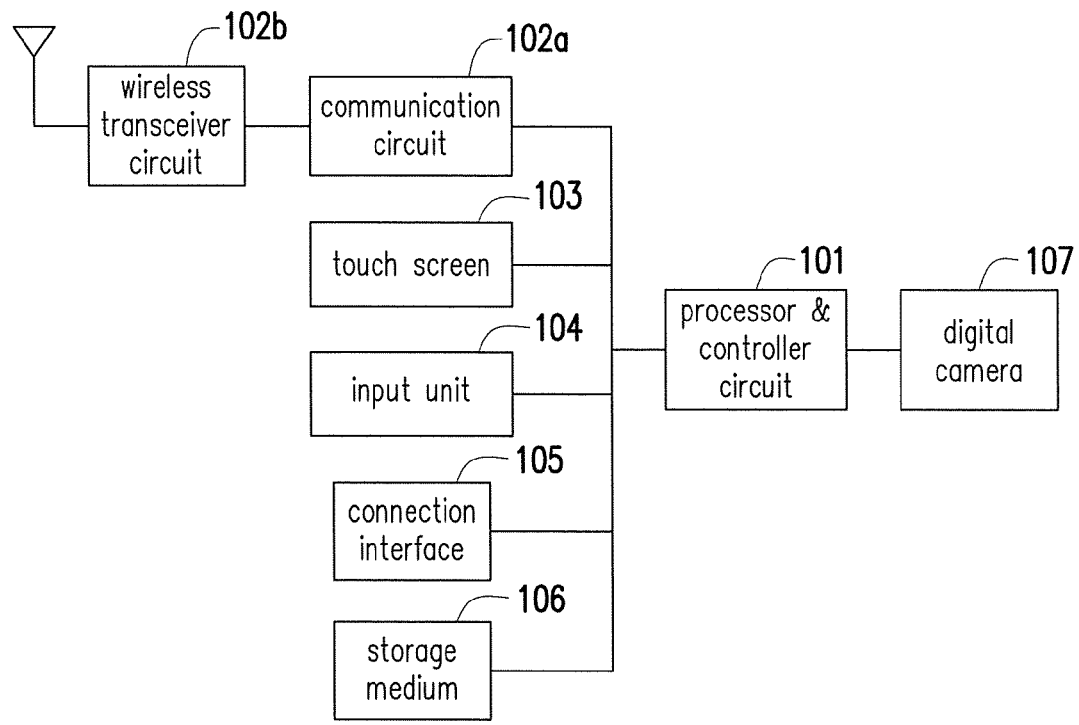
FIG. 1 illustrates a functional diagram of an exemplary portable handheld electronic device.

FIG. 1 illustrates a functional diagram of an exemplary portable handheld mobile electronic device 100 for implementing a method of the present disclosure. The electronic device 100 would assumed to be easily portable and could be held by a person hand. Examples of the above mentioned device could be a smart phone, a mobile phone, a person digital assistant (PDA), an electronic personal organizer, a tablet, and so forth.

The exemplary electronic device 100 would include a processor and controller circuit 101. The processor and controller circuit 101 would be electrically coupled to at least but not limited to a communication 102a, a touch screen 103, an input unit 104, a connection interface 105, a storage medium 106, and a digital camera 107. The digital camera 107 could also be a digital camcorder. The processor and controller circuit 101 may include a micro-controller, a North Bridge, a South Bridge, a field programmable array (FPGA), a programmable logic device (PLD), an application specific integrated circuit (ASIC), or other similar device, or a combination therefore. The processor and controller circuit 101 may also include a central processing unit (CPU) or a programmable general purpose or special purpose microprocessor, a digital signal processor (DSP), a graphics processing unit (GPU), an application specific integrated circuit (ASIC), a programmable logic device (PLD), or other similar device or a combination thereof, which is used for processing all tasks of the exemplary electronic device 100.

The communication circuit 102a could be components which support signal transmissions of a global system for mobile communication (GSM), a personal handy-phone system (PHS), a code division multiple access (CDMA) system, a wireless fidelity (Wi-Fi) system or a worldwide interoperability for microwave access (WiMAX). The communication circuit 102a may also include a wireless transceiver unit 102b to provide wireless access for the portable handheld device. The transceiver unit 102b may include but not limited to a transmitter circuit, a receiver circuit, an analog-to-digital (A/D) converter, a digital-to-analog (D/A) converter, a low noise amplifier (LNA), mixers, filters, matching networks, transmission lines, a power amplifier (PA), one or more antenna units, and a local a storage medium. The transmitter and the receiver transmit downlink signals and receive uplink signals wirelessly. The receiver may include functional elements to perform operations such as low noise amplifying, impedance matching, frequency mixing, down frequency conversion, filtering, amplifying, and so forth. The transmitter may include function elements to perform operations such as amplifying, impedance matching, frequency mixing, up frequency conversion, filtering, power amplifying, and so forth. The analog-to-digital (A/D) or the digital-to-analog (D/A) converter is configured to convert from an analog signal format to a digital signal format during uplink signal processing and from a digital signal format to an analog signal format during downlink signal processing.

The touch screen 103 may contain a display such as a liquid crystal display (LCD), a light-emitting diode (LED) display, a field emission display (FED) or other types of display. The input unit 104 could be, for example, an input device such as a mouse, a keyboard, a joystick, a wheel, and so forth and would receive an input operation from a user. The input unit 104 may also include a resistive, a capacitive or other types of touch sensing device which would be integrated as a part of the touch screen 103.

The connection interface 105 could be, for example, a cable interface such as a universal serial bus (USB) or a wireless interface such as Bluetooth. The connection interface 105 could be a serial interface such as RS232 interface or could be a parallel interface such as USB or Firewire.

The storage medium 106 could volatile or permanent memories which would store buffered or permanent data such as compiled programming codes used to execute functions of the exemplary electronic device 100.

The exemplary electronic device 100 would includes at least a digital camera 107 which captures images and stores images in a digital format. The image could be stored as a still image or a motion picture. The digital camera 107 could be activated, deactivated, and controlled through user interfaces displayed by the touch screen 103.

The smallness of a touch screen of a portable handheld electronic device relative to a normal sized monitor has influenced the design of various applications in such a way that applications originally intended for desktop computer may considered difficult to use in a portable handheld electronic device. Therefore, a method to generate to a preview image on a touch screen of a portable handheld electronic device from an original image and in order to compare among various processed effects on the original image is hereby proposed. The method may include ways to conveniently navigate, browse through, and compare among different effects through an interface and to select and generate a final processed image through control actions using the same interface.

Figure 2:
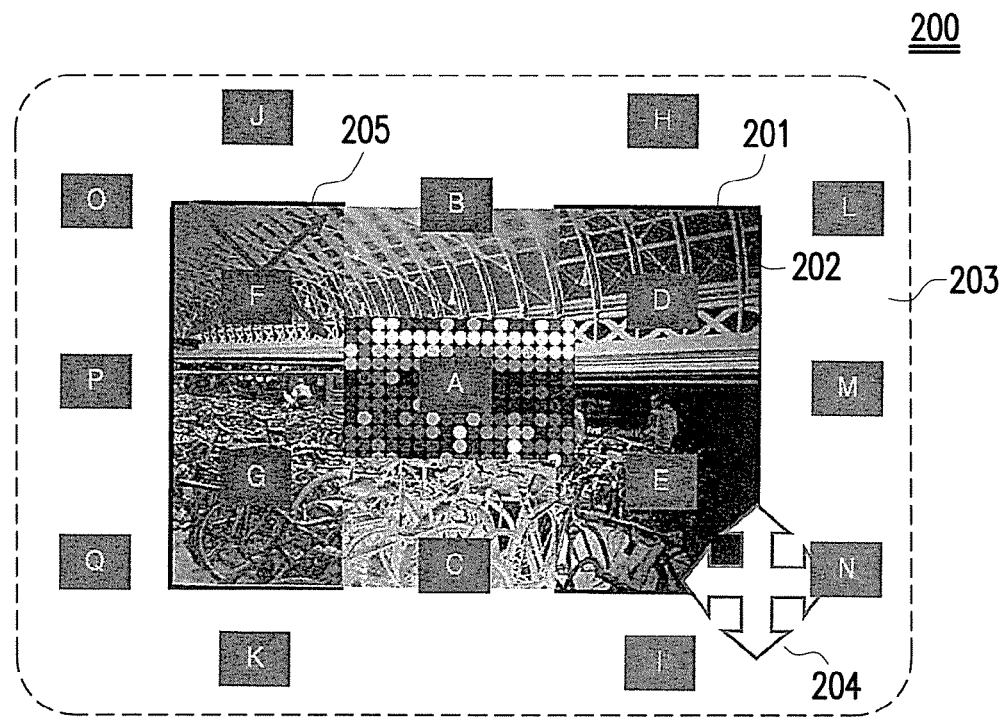
FIG. 2 illustrates a conceptual model of generating a preview image in accordance with one of the exemplary embodiments of the present disclosure.

FIG. 2 illustrates a conceptual model of generating a preview image and selecting a processed image in accordance with one of the exemplary embodiments of the present disclosure. The conceptual model 200 would include at least but not limited to a touch screen 201, an image 202, a movable effect grid 203, a navigational control 204, and a scaling control 205.

The touch screen 201 would display an image 202. A user could either select the image 202 from images stored in storage medium 106 to be processed or a user could activate an application which involve the use of the camera 107, and a captured image from the camera 107 could be processed, previewed, and displayed on the touch screen 201 before or after the captured image is stored in the storage medium 106. The image 202 may also be downloaded through the communication circuit 102a or obtained through the connection interface 105 from another device. The image 202 could be either a still image or a motion picture. For the purpose of having the best clarity of display and at the same time preserving the resolution of the image, the number of image is optimally one as having more than one image displayed on the touch screen 103 would reduce the resolution of both images. However, the application of the present disclosure is not limited to just one image.

The touch screen 201 would also display a movable effect grid 203. The movable effect grid 203 could be activated or deactivated through different types of control functions such as a hardware or a software key or a finger gesture. The size of the movable effect grid 203 may extend beyond the size of the touch screen 103 so that only the portion of the movable effect grid 203 within the touch screen 103 would be displayed, and the rest could be assumed to exist in an abstract plane and kept track of by the processing circuit 101. The movable effect grid 203 is divided into a plurality of areas as labeled by the alphabets A through Q in FIG. 2. The number of areas could be customized by a user through a settings menu or through a combination of buttons or finger gestures.

When the movable effect grid 203 is activated, the grid 203 would superimpose with the image 202 and triggered an interaction between the movable effect grid 203 and the image 202. More specifically, the processing circuit 101 would perform an image processing according to the interaction between the movable effect grid 203 and the image 202 and display on the touch screen 103 a preview image. The main intention is for each area of the plurality of areas A~Q to produce a different image processing effect on an input image. However, a user may configure two different areas to produce the same image. Also, some areas or a portion of an area may not produce any image processing effects but would otherwise be reserved for other purpose such as to display a boundary, a ruler or a coordinate.

Each area of the plurality of areas A~Q could be thought of as having a unique transfer function for the purpose of generating an effect. For example, the transfer function may be implemented as a linear or non-linear filter. In other words, when an area of the movable effect grid 203 superimposes with an area of the image 202, the transfer function would perform a convolution operation on the overlapped area of the image 202 in the spatial domain to generate a processed image. In another embodiment, the transfer function may also be implemented as a polynomial, exponential, or other types of formulas to perform noise reduction, contrast enhancement, white balance, sharpness, smoothness, color transformation or geometric transformation. The geometric transformation could be translation, scaling, rotation, skew or shear transformation, or distortion. In addition, the transfer function could global, that is, the transfer function may use pixels other than the pixels in the overlapped area to generate a processed image.

Thus, one of the intentions of the movable effect grid 203 would be to generate a plurality of different effects on a preview image to be compared on a side by side basis. The movable effect grid 203 is divided into areas according to a predetermined pattern which is user customizable. As each area of the movable effect grid 203 generates a specific effect, the portion of the image 202 overlapped with a particular area of the movable effect grid 203 would result in a preview image influenced by the transfer function of the specific area. When a user has decided upon an effect after the user has observed the preview image which exhibits different effects in different areas of the preview image, the user could then generate a final processed image using the selected effect.

For the example of FIG. 2, a user may observe 7 different effects imparted by area A, B, C, D, E, G, G of the movable effect grid 203 on the image 202 which is currently a preview image of a single input image. As the movable effect grid 203 is divided into a plurality of areas according to a predetermined pattern, the preview image would be influenced as though it is also divided into a plurality of areas according to the same predetermined pattern. Suppose that a user likes the appearance of one of the areas of the preview image, for instance, the user likes what he or she sees in area labeled B in FIG. 2, the user may select area B as displayed on the touch screen 201, and the touch screen 201 would then display a single processed image on the entirety of the touch screen 201 based solely on the effect imparted by the transfer function of area B of the movable effect grid 203.

One of the features of the movable effect grid 203 would be that it is movable. Suppose for the example of FIG. 2 that a users would like to see what effect could be produced by area H of the movable effect grid 203 on the lower right hand corner of the image 202 currently displayed by the touch screen 201, the user merely has to move the effect grid 203 to the lower right hand corner through a touch input on the movable effect grid 203 as displayed by the touch screen 201. In this way, a user could easily preview any effect imparted by any area of the movable effect grid 203 in any part of the image 202. Although area H is invisible since it is beyond the edge of the touch screen 201, when a user pan the movable effect grid 203 directly downwards, area H would appear from the top of the touch screen 201 and be moved to the lower right hand corner of the touch screen 201 to generate the effect based on the transfer function of area H. It should be noted that although the navigational control 204 symbolized by the cross like symbol on FIG. 2 appear to indicate 4 directions, the movable effect grid 203 could be moved 360 degrees toward any direction.

One of the features of the movable effect grid 203 would be that it is scalable as indicated by the scaling control 205 which is represented by an X like symbol. The size of the movable effect grid 203 could be enlarged or reduced according to a touch action on the movable effect grid 203. Assuming that a user wants to be able to distinguish between effects that could be subtle, the user may enlarge the effect grid 203 so that the effect grid 203 would impose less number of areas on the image 203. Less number of areas would mean more pixels per area so that subtle effects could be more pronounced when displayed with more pixels. If a user wants to more effects to compare with, the user may reduce the movable effect grid 203 so that there would be a higher number of areas on the image 203. High number of areas would mean less pixels per area, but the image would be able to exhibit more effects.

Figure 3:
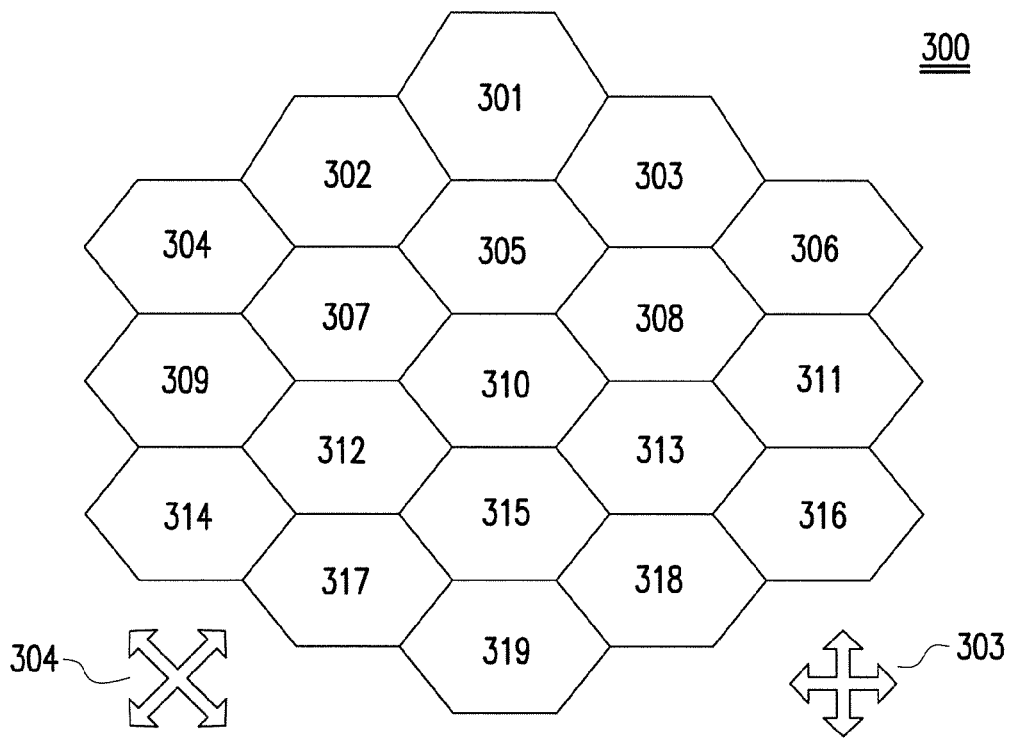
FIG. 3 illustrates a honeycomb shaped movable effect grid in accordance with one of the exemplary embodiments of the present disclosure.

The concept of FIG. 2 could be further explained with an exemplary embodiment. FIG. 3 illustrates a honeycomb shaped movable effect grid in accordance with one of the exemplary embodiments of the present disclosure. The exemplary movable effect grid 300 is shaped like a honeycomb and includes a configurable number of area of effects. A user may configure the number of areas through any interface or control mechanism which is not limited by the present disclosure such as a finger gesture, a settings menu, a pull down menu, a pop up window, a menu bar, and etc. . . . . A user may also configure the shapes of the areas if aesthetic considerations or if any shape could show an effect more clearly. Assuming that 19 areas 301~319 are currently configured, a maximum of 19 different effects could be introduced to a preview image according to the respective transfer function of each area 301~319 assuming that no two areas are configured to have the same effect. The movable effect grid 300 would also have features related to navigational control 303 and scaling control 304 based on touch actions on the touch screen 104.

Figure 4:
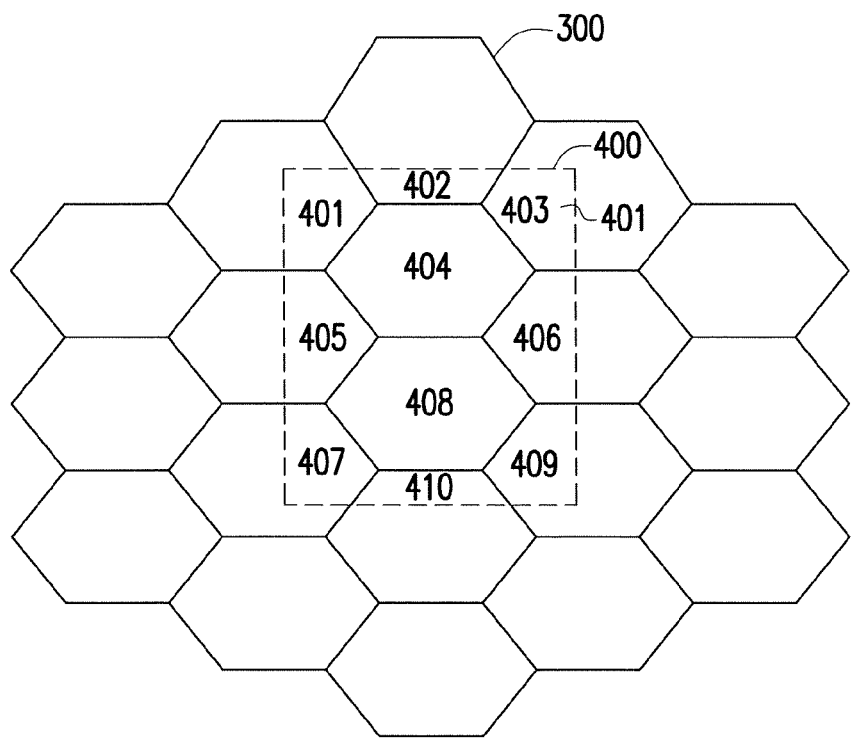
FIG. 4 illustrates an application of the honeycomb shaped movable effect grid in accordance with one of the exemplary embodiments of the present disclosure.

FIG. 4 illustrates an application of the honeycomb shaped movable effect grid on an image in accordance with one of the exemplary embodiments of the present disclosure. Assuming that the same effect grid 300 of FIG. 3 is applied on an input image which has been configured to take up the entire area of the touch screen 400 in order to maximize the resolution of the image, the movable effect grid 300 would produce difference effects on areas 401~409 on a preview image 401 based on the different effects or transfer functions generated by the areas 305, 307, 308, 310, 312, 313, 315 respectively. A user may then discerned among different effects and select a preferred effect to generate a processed image. If the user for example is satisfied with the effect generated in area 404 of the preview image 401, the user would then perform a touch and release action on 404 to generate a processed image (not shown).

Figure 5:
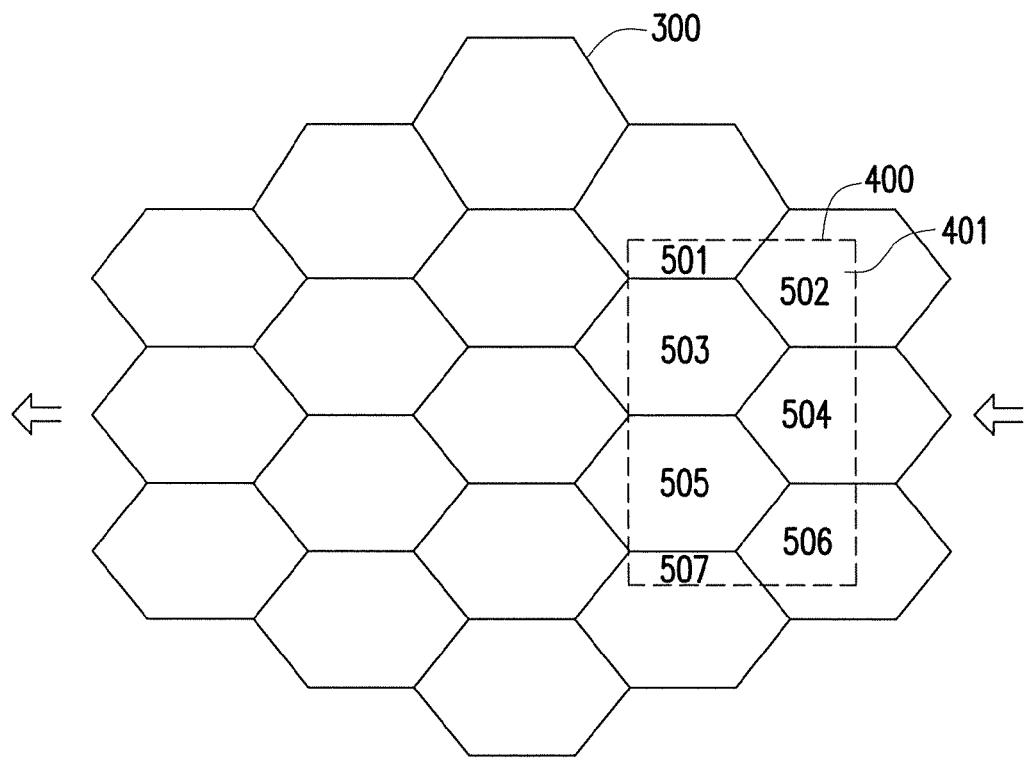
FIG. 5 illustrates moving the honeycomb shaped movable effect grid in accordance with one of the exemplary embodiments of the present disclosure.

Assuming that a user wants to see what a particular effect would look like in other areas of the preview image, the user may move the movable effect grid 300 to another location of the preview image to change the preview image to exhibit the particular effect on another desired section of the preview image. FIG. 5 illustrates moving the honeycomb shaped movable effect grid in accordance with one of the exemplary embodiments of the present disclosure. The mechanism for navigational control 303 could be a touch and slide action. This means that when a user touches the movable effect grid 300 and then follows with a sliding action, the movable effect grid 300 would move in accordance with the direction and displacement of the slide action. Also as mentioned previously, if the user would like to select a particular effect of an area, the user could select the effect of the area by a touch and release action without the sliding action. In other words, in response to the user releasing the touch action on a selected area of the movable effect grid 300, an original input image would be transformed into a processed image using the effect or the transfer function of the selected area. In one of the embodiments, if a user performs a touch action and not followed by a release action within a predetermined period such as 1 second, the touch action would be considered an action to move the effect grid 300.

For the example of FIG. 5, after a user performs a touch action followed by a slide action to the left, the movable effect grid is to moved to another location to generate a different set of areas 501~507 of the preview images with each area exhibiting an effect according to the transfer function of the areas 303, 306, 308, 311, 313, 316, and 318 of the effect grid 300 respectively. If the user still wants to see what effect would be produced on the preview image 401 by the area 318 of the effect grid 300 more clearly, the user may perform a touch and sliding up action to bring area 318 of the effect grid 300 further into the area of the touch screen 400.

Figure 6A:
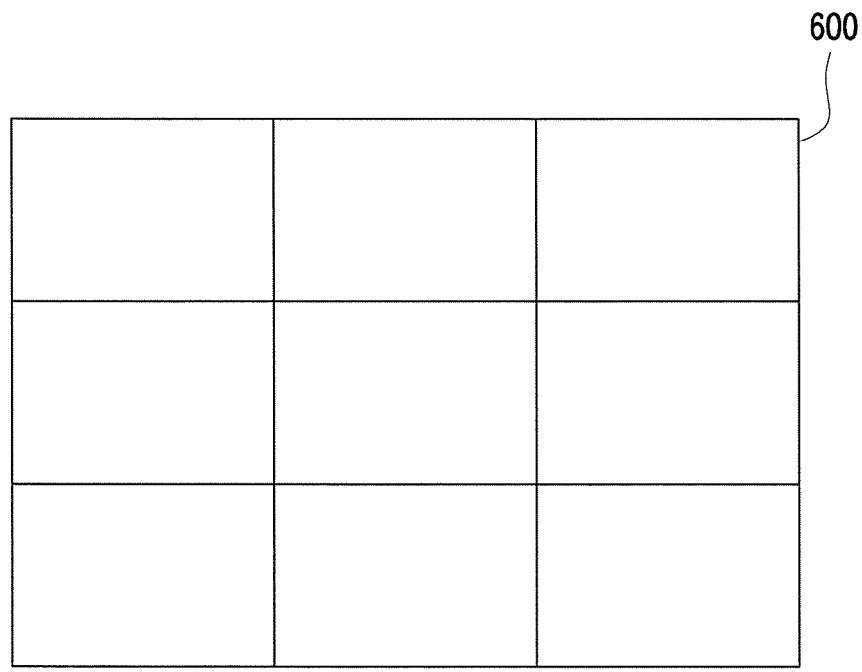
FIGS. 6A & 6B illustrates alternative shapes for an exemplary movable effect grid.
Figure 6B:
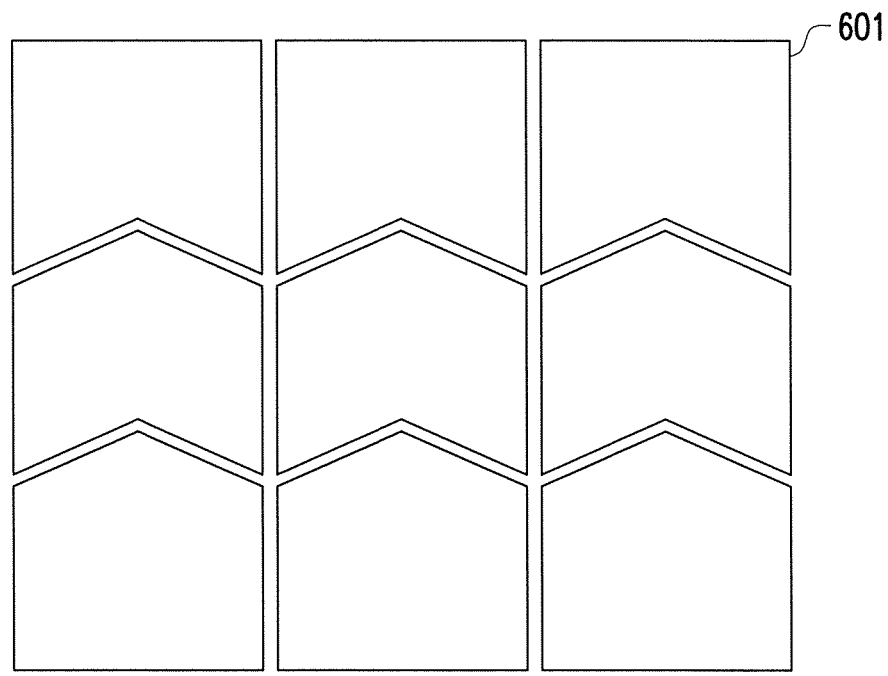

FIGS. 6A & 6B illustrates alternative shapes for an exemplary movable effect grid. The shapes of a movable effect would not be limited to a honeycomb shape as a user may configure the effect into a square shape such as the one in FIG. 6A or into a irregular shape such as the one in FIG. 6B.

Figure 7:
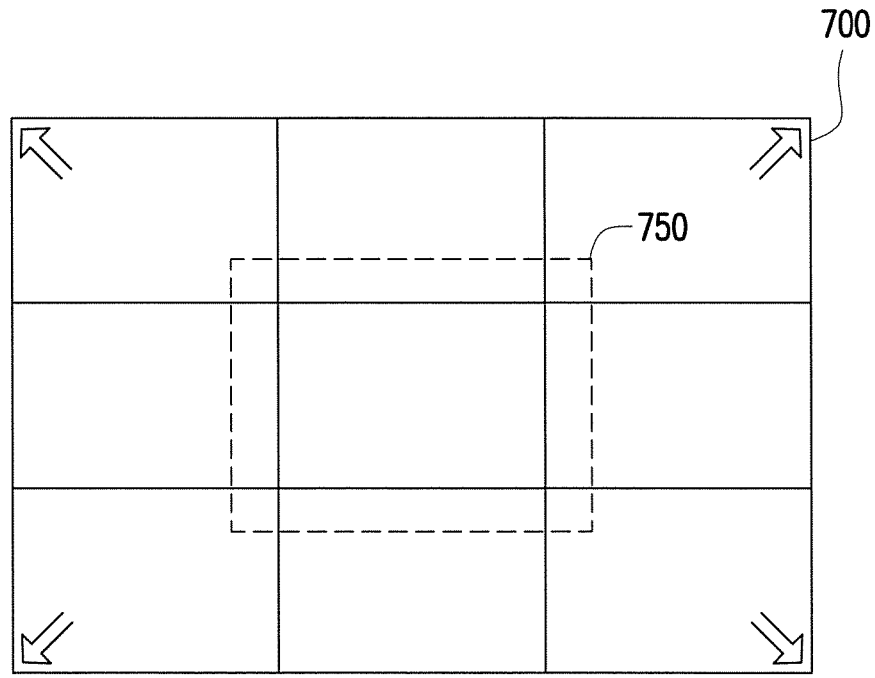
FIG. 7 illustrates scaling of the movable effect grid in accordance with one of the exemplary embodiments of the present disclosure.

FIG. 7 illustrates scaling of the movable effect grid in accordance with one of the exemplary embodiments of the present disclosure. The movable effect grid 700 as mentioned previously would include a mechanism for scaling control. The scaling control could be achieved based on a two finger touch gesture. When the input unit 104 detects two simultaneous touches on the touch screen 103, the processing circuit 101 would know that a user could perform a scaling control function. If a user wants to enlarge the movable effect grid 700, the user could first make a touch gesture with two fingers on the touch screen 750 in the place where the effect grid 700 exists. The user could then enlarged the size of the movable effect grid 700 by increasing the distance between the two fingers. Similarly, the user could reduce the size of the movable effect grid 700 by reducing the distance between two fingers. As mentioned previously, larger size of the movable effect grid 700 would mean that less number of effects would be exhibited by a preview image, and smaller size would mean more numbers of effect would be exhibited by the preview image.

Figure 8:
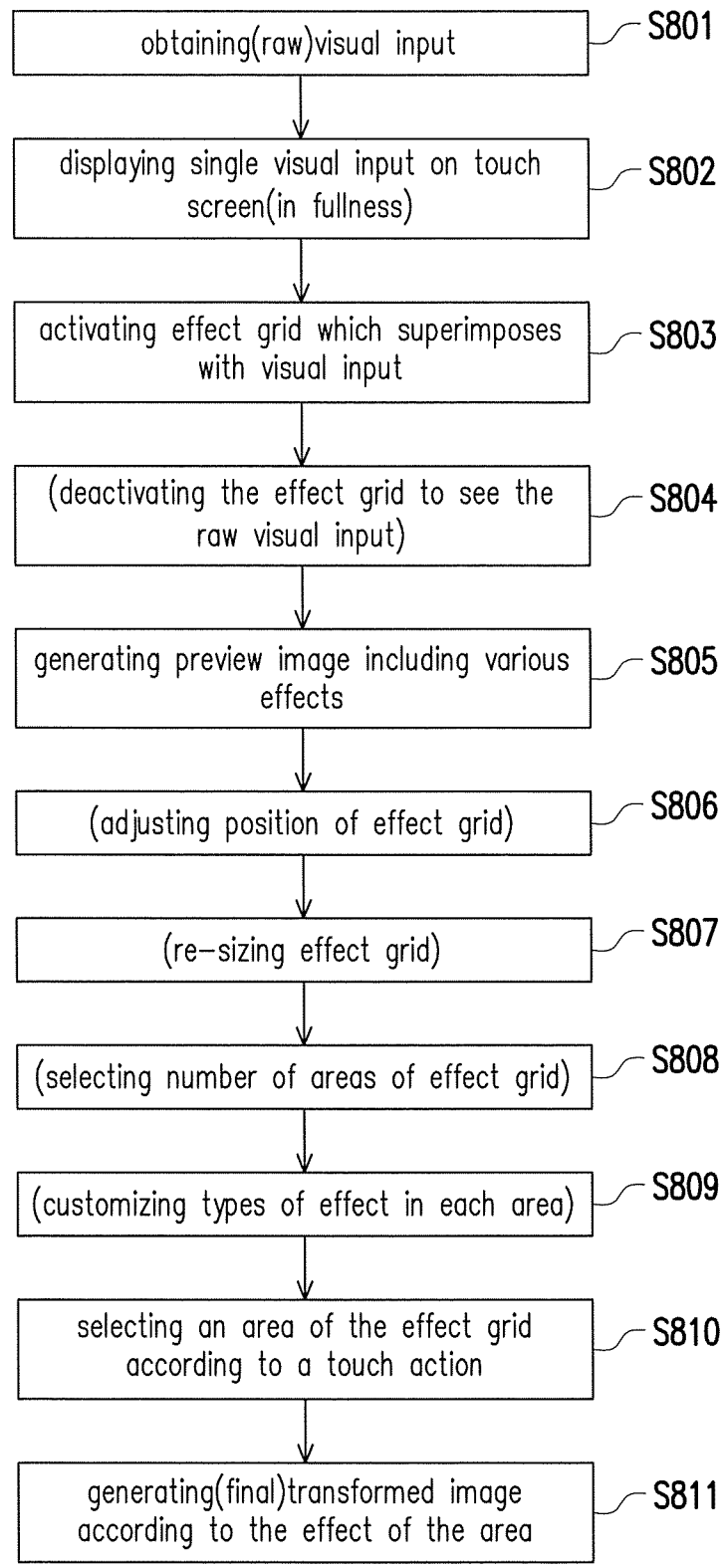
FIG. 8 is a flow chart which illustrates the procedure of generating a preview image using the movable effect grid to produce a processed image in accordance with one of the exemplary embodiments of the present disclosure.

FIG. 8 is a flow chart which illustrates the procedure of generating a preview image using the movable effect grid to produce a processed image in accordance with one of the exemplary embodiments of the present disclosure. It should be noted that these following steps may not have to be performed according to a particular order as it could apparent for one skilled in the art that other orders could be performed to achieve the same purpose. In step S801 an input image is selected and activated. The image could be a still image or a motion picture. In step S802, the input image is displayed on a touch screen. In order to view effects on an input image in its maximum resolution, a single image taking up the entire touch screen would be optimal; however, more than one image could be displayed. In step S803, an effect grid could be activated to superimpose with the input image. Step S804 is optional and could be performed by the user at any time to deactivate the effect grid in order to see the original image in a state which is not affected by the effect grid. In step S805, a preview image would be generated as the result of the interaction between the selected input image and the effect grid. In step S806, a user may optionally adjust the position of the effect grid to see a different effect in other parts of the input image. In step S807, a user may optionally choose to resize the effect grid to adjust the sizes of the area of the effect grid on the input image. In step S808, a user may optionally customize the number of areas of the effect grid. In step S809, a user may optionally customize the type of effects in each area of the effect grid. In step S810, a user may select a particular effect by selecting from the effect grid the corresponding area which generates the particular effect. In step S811, the original input image is processed according to the effect of the selected area of the effect grid and is transformed into a processed image.

Figure 9:
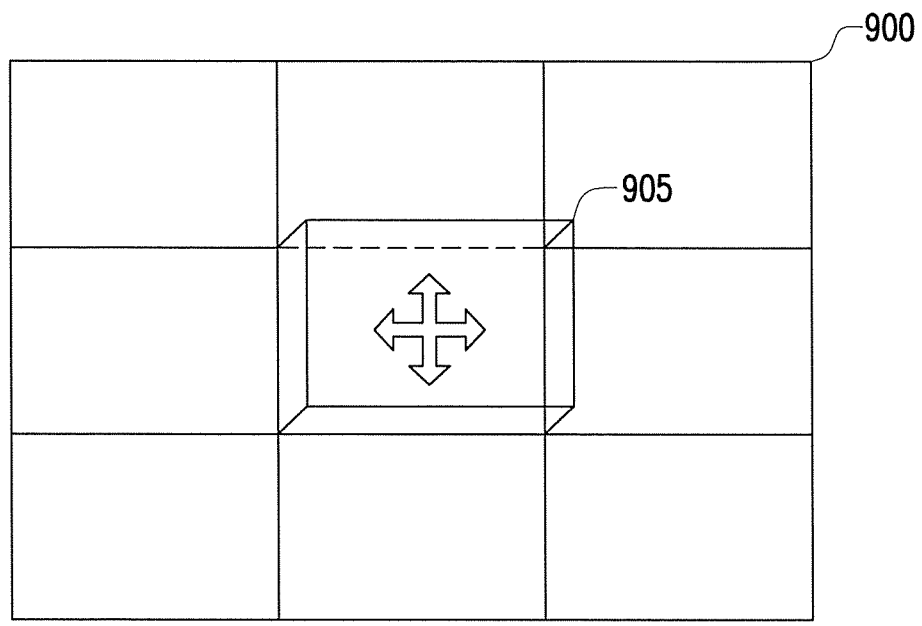
FIG. 9 illustrates a movable effect grid in accordance with another one of the exemplary embodiments of the present disclosure.

FIG. 9 illustrates a movable effect grid in accordance with another one of the exemplary embodiments of the present disclosure. In this exemplary embodiment, it is similar to the embodiment of FIG. 2 but an area of a movable effect grid could be selected and singled out to perform image processing functions. Assuming that an effect grid 900 having rectangular shaped areas is configured for 9 different effects as a 3x3 matrix grid, a user may select one of the areas, for example, the middle area 905. In one of the embodiments, a selected area may be highlighted. Only the selected area 905 itself could be moved to interact with an original image to generate a preview age, but other unselected areas would remain stationary. As the selected area 905 is being moved, a user could dynamically observe the effect of the area 905 on an original image. In this way, the user could see the changing preview image influenced only by the selected area 905 while other parts of the preview image would remain the same. In one exemplary embodiment, the effect of the moving area 905 would override the effect of other areas if the two effects were to collide. In one exemplary embodiment, the effects of non-selected areas would be disabled or grayed out if a particular area has been singled out or highlighted. In one exemplary embodiment, when effect of a moving area such as the area 905 collide with another area, the effect of two areas could be cumulative. In one exemplary embodiment, a user may single out an area by a touch action on a particular area such as a touch and hold action for a predetermined period.

Figure 10:
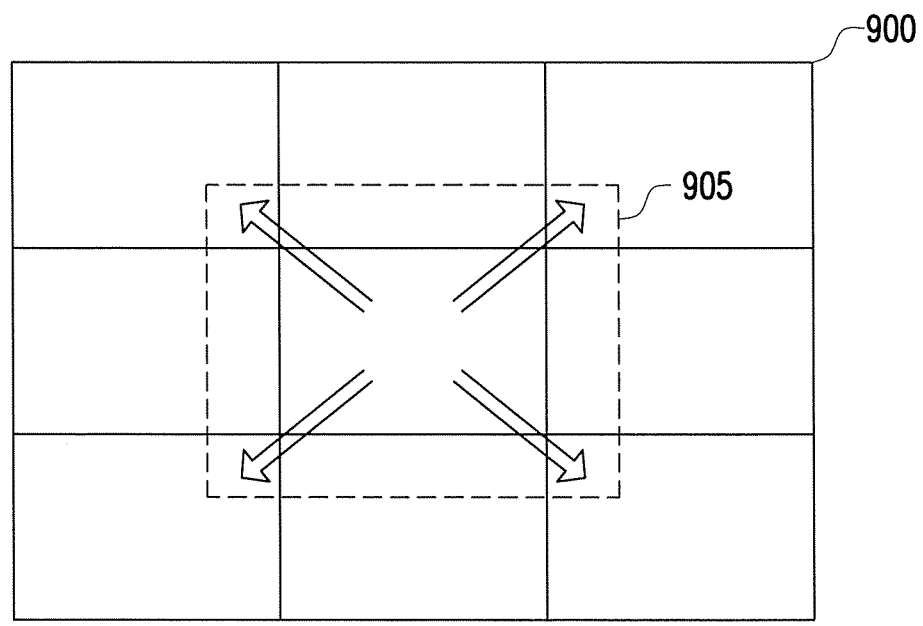
FIG. 10 illustrates re-sizing the movable effect grid in accordance with another one of the exemplary embodiments of the present disclosure.

FIG. 10 illustrates re-sizing the movable effect grid in accordance with another one of the exemplary embodiments of the present disclosure. In this particular embodiment, an area could be selected, singled out, and expanded. For instance, assuming the same movable effect grid as FIG. 9, the middle grid could be selected and then singled out according to a touch action. As the middle grid has been singled out, a user could expand only the middle area by performing a touch action such as a two finger gesture as mentioned previously while the size of other areas would remain the same. In this way, a user may more closely examine the effect of any particular area while other areas are left unchanged for comparison purposes so that a user may simultaneously examine a particular effect and also make comparisons among many other effects in a side by side manner.

Figure 11:
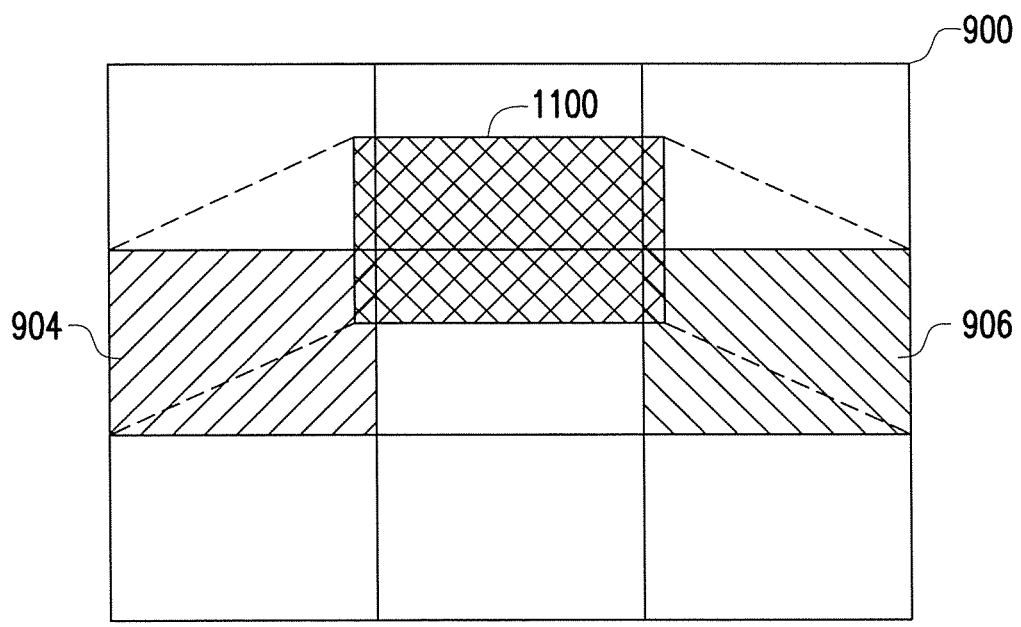
FIG. 11 illustrates combining two area effects of the movable effect grid in accordance with another one of the exemplary embodiments of the present disclosure.

FIG. 11 illustrates combining two area effects of the movable effect grid in accordance with another one of the exemplary embodiments of the present disclosure. In this particular embodiment, a user may create a super area having synergistic effect based on the effect of two different areas. Suppose that a user wants to create an aqua effect and a distortion effect. Normally this would require two different steps as a user would first create a processed image using the aqua effect and then apply the distortion effect on the same processed image to create a second processed image with both the aqua effect and the distortion effect. However, this could be accomplished also through the interface of the movable effect grid 900 by highlighting a first area 904 which could be assumed to have the aqua effect based on a touch and hold action and also the simultaneously highlighting a second area 906 which could be assumed to have the distortion effect. By merging the two areas 904 906 through touch and slide actions, it would create a super area 1100 which would have the combined transfer function of two effects, namely, the aqua distortion effect.

In view of the aforementioned descriptions, the present disclosure is able to generate a processed image by comparing among various effects generated within a preview image using a movable grid which imparts various effects in different areas of the grid. By doing so, pixel resolution of the original image would be maintained while side by side comparison among different effects could be made. Also, the movable grid is easy to use and could easily be moved and resized. By selecting an area among predetermined areas of the movable grid, a processed image could be generated based on the particular effect of the selected area.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents. Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A method of displaying a processed image on a touch screen of a portable handheld electronic device, and the method comprises:
    displaying on the touch screen an image;
    displaying on the touch screen a movable effect grid which is divided into a plurality of areas in two dimensions according to a predetermined pattern with each area producing a different effect;
    performing image processing between the image and the movable effect grid to generate a first preview image which has different effects in different areas defined by the predetermined pattern;
    displaying the first preview image on the touch screen; and
    moving the effect grid displayed on the touch screen according to a first touch action on the touch screen to generate a second preview image, wherein by moving the effect grid, the second preview image exhibits different effects in different areas defined by the predetermined pattern, wherein the effect grid is 360 degrees movable toward any direction; and
    displaying only a portion of the effect grid within the touch screen as long as any portion of the effect grid moves off the screen into an abstract plane, wherein a size of the effect grid is greater than the a size of the touch screen.

2. The method of claim 1 further comprising:
- selecting from the plurality of areas of the effect grid a first area which has a first effect according to a second touch action on the first area;
- generating the processed image based on the first effect of the first area on the entirety of the image; and
- displaying the processed image on the touch screen.

3. The method of claim 2 wherein the processed image is processed from a raw footage within a camera or camcorder application of the portable handheld electronic device.

4. The method of claim 2, wherein the second touch action is a touch and release action such that the processed image is generated in response to the release action of the touch and release action.

5. The method of claim 1 further comprising:
- applying a two finger touch action on the effect grid to adjust the size of the effect grid such that the effect grid is enlarged when the distance between the two fingers lengthens and the effect grid is shortened when the distance between the two fingers shortens.

6. The method of claim 1, wherein the size of the effect grid is larger than the touch screen.

7. The method of claim 1, wherein each area of the effect grid has the same default size.

8. The method of claim 1, wherein the first touch action is a touch and slide action such that a movement of the effect grid corresponds to a movement of the slide action.

9. The method of claim 1, wherein the number of the areas of the effect grid is user configurable via a settings menu.

10. A portable handheld electronic device comprising:
- a storage medium for storing at least a photograph or a video;
- a touch screen for displaying a image comprising the photograph or the video;
- a processing circuit, coupled to the storage medium and the touch screen, and is configured for displaying through the touch screen the image, displaying through the touch screen a computer generated effect grid which is divided into a plurality of areas in two dimensions according to a predetermined pattern with each area producing a different effect, superimposing the effect grid on the image to generate a first preview image which has different effects in different areas of the first preview image according to the predetermined pattern, and displaying through the touch screen the first preview image on the touch screen; and
- an input unit coupled to the processing circuit for receiving a first touch action; and the processing circuit is further configured for moving the effect grid displayed on the touch screen according to the first touch action on the touch screen to generate a second preview image, wherein each area of the moving effect grid produces the different effect according to the predetermined pattern for the second preview image, wherein the effect grid is 360 degrees movable toward any direction, and the processing circuit is further configured for displaying only a portion of the effect grid within the touch screen as long as any portion of the effect grid moves off the screen into an abstract plane, wherein a size of the effect grid is greater than the a size of the touch screen.

11. The device of claim 10 wherein the processing circuit is further configured for:
- selecting from the plurality of areas of the effect grid a first area according to a second touch action on the first area through the input unit, generating on the touch screen a processed image based on the effect of the first area on the entire image, and displaying the processed image on the touch screen.

12. The device of claim 11 wherein the processed image is from a raw footage within a camera or camcorder application of the portable handheld electronic device.

13. The device of claim 11, wherein the second touch action is a touch and release action such that the processed image is generated in response to the release action of the touch and release action.

14. The device of claim 10 wherein the processing circuit is further configured for adjusting the size of the effect grid in response to a two finger action detected by the input unit.

15. The device of claim 10, wherein the size of the effect grid is larger than the touch screen.

16. The device of claim 10, wherein each area of the effect grid has the same size.

17. The device of claim 10, wherein the first touch action is a touch and slide action such that a movement of the effect grid corresponds to a movement of the slide action.

18. A non-transitory storage medium containing at least computer programs configured for a portable handheld electronic device to execute functions comprising
- displaying on a touch screen an image comprising a photograph or a video;
- displaying on the touch screen a computer generated effect grid which is divided into a plurality of areas in two dimensions according to a predetermined pattern with each area producing a different effect;
- superimposing the effect grid on the image to generate a first preview image which has different effects in different areas of the first preview image according to the predetermined pattern; and
- displaying the first preview image on the touch screen; and
- moving the effect grid displayed on the touch screen according to a touch action on the touch screen to generate a second preview image, wherein by moving the effect grid, the second preview image exhibits different effects in different areas defined by the predetermined pattern, wherein the effect grid is 360 degrees movable toward any direction; and
- displaying only a portion of the effect grid within the touch screen as long as any portion of the effect grid moves off the screen into an abstract plane, wherein a size of the effect grid is greater than the a size of the touch screen.

* * * * *